united States Patent [19]

Brown et al.

[11] Patent Number: 4,717,623

[45] Date of Patent: Jan. 5, 1988

[54] RADIATION-CURABLE COATING COMPOSITIONS APPLIED TO FLUORINE-TREATED SURFACES

[75] Inventors: Wallace H. Brown, Des Plaines; Dennis G. Anderson, Arlington Heights; John T. Vandeberg, Barrington, all of Ill.

[73] Assignee: DeSoto, Inc., Des Plaines, Ill.

[21] Appl. No.: 818,865

[22] Filed: Jan. 14, 1986

[51] Int. Cl.$^4$ .......................... G11B 5/70; G11B 5/702
[52] U.S. Cl. ...................................... 428/409; 427/44; 427/128; 427/129; 427/131; 427/255.1; 428/480; 428/483; 428/694; 428/900; 428/521
[58] Field of Search ............. 427/255.1, 41, 128, 427/131, 44, 129; 428/409, 694, 900, 480, 483, 521; 523/181

[56] References Cited

U.S. PATENT DOCUMENTS

| | | | |
|---|---|---|---|
| 3,394,023 | 7/1968 | Wilhelm | 427/129 |
| 4,188,426 | 2/1980 | Auerbach | 427/41 |
| 4,237,156 | 12/1980 | Boultinghouse | 427/255.1 |
| 4,250,225 | 2/1981 | Shirahata | 428/33 |
| 4,264,750 | 4/1981 | Anand | 525/356 |
| 4,296,151 | 10/1981 | Boultinghouse | 427/255.1 |
| 4,465,715 | 8/1984 | Manabe | 427/41 |
| 4,468,412 | 8/1984 | Fujii | 427/41 |
| 4,491,653 | 1/1985 | McGinniss | 525/521 |
| 4,496,686 | 1/1985 | Ansel | 523/181 |
| 4,555,449 | 11/1985 | Koleske | 427/44 |
| 4,575,475 | 7/1984 | Nakayama | 427/129 |
| 4,585,702 | 4/1986 | Osborn | 427/44 |
| 4,594,262 | 6/1986 | Kreil | 427/44 |
| 4,607,068 | 8/1986 | Ansel | 528/61 |

Primary Examiner—Ellis P. Robinson
Attorney, Agent, or Firm—Dressler, Goldsmith, Shore, Sutker & Milnamow, Ltd.

[57] ABSTRACT

A method is disclosed for increasing the adhesion of a radiation-curable coating composition to a surface which comprises treating the surface with a fluorine-containing gas before application of the coating and curing the coating composition by exposure to radiation. The increased adhesion of radiation-curable pigmented coating compositions to treated magnetic recording structures, such as tapes and disks, is particularly contemplated.

12 Claims, No Drawings

RADIATION-CURABLE COATING COMPOSITIONS APPLIED TO FLUORINE-TREATED SURFACES

TECHNICAL FIELD

The present invention relates to a method for increasing the adhesion of a radiation-curable coating composition to a surface which comprises briefly treating the surface with a low concentration of fluorine in an inert gas before application of the coating composition. The increased adhesion of radiation-curable pigmented coating compositions to treated magnetic recording structures, such as tapes and disks, is particularly contemplated.

BACKGROUND OF THE INVENTION

It has long been recognized that the fluorination of a polymeric surface can increase the water-wettability of the surface under certain conditions L. J. Hayes, *J. Fluorine Chem.*, 8, 69 (1976). It is also known that aliphatic fluorination, rather than aromatic fluorination, is the primary reaction L. J. Hayes et al., *J. Fluorine Chem*, 10, 1 (1977) In addition, monofluorination of a carbon atom in a polymer is preferred over difluorination since excessive difluorination may decrease the adhesive properties of the polymeric surface.

Several methods have been disclosed for treating polymeric surfaces with fluorine-containing gases to promote the adhesion of subsequently applied coatings. Treatment times are generally in the range of several minutes to several hours, and fluorine concentrations are at least 1 percent fluorine by volume. In fact, according to the prior methods, fluorine concentrations are usually much greater than 1 percent by volume.

Those methods that disclose relatively short treatment times employ fluorine-containing gases having relatively high fluorine concentrations. On the other hand, those methods that disclose relatively long treatment times are able to employ gases having relatively low fluorine concentrations.

The methods of the prior art, however, do not describe the simultaneous use of both relatively short treatment times and relatively low fluorine concentrations to achieve the improved adhesion of coatings to a polymeric surface. This is probably because such superficial treatment does not perceptibly modify the adhesion characteristics of ordinary coatings. The economic advantages of short treatment times in combination with low fluorine concentrations will be apparent to those familiar with commercial processes of the type described herein.

With reference to those prior methods, U.S. Pat. No. 4,237,156 to Boultinghouse describes a process for treating a surface with a fluorine-containing gas to render the surface water-wettable and receptive to an adhesive, a coating or the like. The disclosed surfaces are formed of poly(arylene) sulfide resins. Treatment times range from about 30 seconds to greater than 30 minutes, and the concentration of fluorine in the gas is within the broad range of about 1 percent to 99 percent by volume. The disclosed reaction temperature is between about 65 degrees C. and 100 degrees C. In the examples of Boultinghouse, the following conditions were employed a treatment time of 5 minutes, a fluorine concentration of 10 percent by volume and a temperature of 82 degrees C.

U.S. Pat. No. 4,296,151, also to Boultinghouse, relates to the treatment of a surface with a fluorine-containing gas to achieve the same effects described in the '156 patent. The range of treatment times and the concentration of fluorine in the gas is similar to that described above; but the permissible range of the reaction temperature is broadened to from about 15 degrees C. to about 100 degrees C.

With respect to a continuous process (presumably for commercial use), however, Boultinghouse states at column 3, lines 29–34, of the '151 patent that the fluorine concentration of a fluorine-containing nitrogen gas should be at least 10 percent by volume fluorine and that the fluorine concentration of a fluorine-containing helium gas should be at least 75 percent by volume fluorine.

In the examples of the '151 patent, Boultinghouse describes a treatment time of 5 minutes, a fluorine concentration of 10 percent by volume fluorine in nitrogen and reaction temperatures of 82 degrees C. and 93 degrees C.

U.S. Pat. No. 4,454,219 to Yamadera et al. discloses that the ultraviolet cure of a coating may be improved by use of an organic halogen compound in the coating composition. The disclosed, organic halogen compounds include carbon tetrachloride, chloroform, bromoform, iodoform and the like. The preferred organic halogen compounds include those having a tribromomethyl group.

Yamadera et al. suggest that halogen radicals produced directly or indirectly by irradiation of the organic halogen compound withdraw hydrogen from a hydrogen donor, and the resulting hydrogen halide reacts with a aliphatic amino group-containing monomeric unit of a polymer to form polar ionic groups, in particular, quaternary ammonium salts. The polar ionic groups provide improved adhesion of the coating to a surface to which the coating is applied.

Yamadera et al., however, do not disclose the use of fluorine. Moreover, the disclosure of Yamadera et al. relates to a material that is incorporated into the coating composition and not to any moieties that might be present on the surface being coated.

U.S. Pat. No. 4,491,653 to McGinniss et al. relates to a method for fluorinating the surface of a polymeric solid which comprises contacting the solid with a dilute fluorine gas at about room temperature to partially fluorinate the solid surface. The contact time is from about 1–30 minutes, and the concentration of fluorine in the gas is less than about 4 percent by volume. McGinniss et al. refer to their method as an extra dilute phase fluorination reaction, and yet in the disclosed examples the solid was contacted with a gas having a fluorine concentration of about 2.55 percent by volume.

Moreover, McGinniss et al. indicate at column 2, lines 11–12, that with respect to methods for fluorinating the surface of a polymeric solid, it is difficult to predict the resulting properties of the treated material.

Upon review of the prior art, one would not expect a fluorine-containing gas containing less than 1 percent flourine by volume to have any significant effect on the adhesion properties of a polymeric surface, particularly when the surface is treated with the gas at relatively short exposure times of less than about 1 minute. Indeed, for ordinary heat-cured coatings no improvement in adhesion has been observed. Accordingly, the improved adhesion of a radiation-curable coating composition to the polymeric surface of a magnetic recording structure, such as a tape or disk, when treated with a fluorine-containing gas, in the superficial manner described herein, is unexpected.

DESCRIPTION OF THE INVENTION

According to the present invention, a surface, preferably a polymeric surface such as a terephthalate polyester, is contacted with a fluorine-containing gas comprising a volume of fluorine and a larger volume of an inert gas, for example, nitrogen or helium, which acts as a nonreactive diluent. More particularly, the amount of fluorine included in the fluorine-containing gas is less than about 1 percent by volume, based on the total volume of the gas at the particular temperature and pressure at which the treatment is performed. As a result, the amount of nitrogen or other diluent gas in the fluorine-containing gas is greater than about 99 percent by volume.

Additional suitable inert gases include neon, argon and similar nonreactive gases. The use of nitrogen, in particular, oxygen-free nitrogen, as the diluent gas is preferred since nitrogen is a relatively inexpensive inert gas.

Thereafter, a radiation-curable coating composition is applied to the fluorine-treated surface, and the coating is cured by exposure to radiation. As will be further described herein, particularly preferred coating compositions comprise radiation-curable magnetic media materials. Adhesion between the coating and the treated surface is improved relative to the adhesion between the coating and an untreated surface.

The surface may comprise polymeric materials including polyesters, polyolefins such as polyethylene, polypropylene and polyisobutylene, silicone resins, phenolic resins, polyvinyls, polyacrylates, polyethers, polyamides, polysulfones, cellulosic materials, polycarbonates, polyepoxides, polyacrylonitriles and a wide variety of other polymeric materials. The polymeric materials may form polymeric surfaces in the form of sheets or webs, in fiber form or in any other convenient shape or form. The surface may also comprise a metal, ceramic or glass. In a preferred embodiment, however, the surface comprises a terephthalate polyester.

The reaction time or the length of time that the surface is treated or contacted with the fluorine-containing gas is normally less than about 1 minute. Preferably, the reaction time is from about 5 seconds to about 50 seconds and more preferably from about 10 seconds to about 40 seconds. Surfaces in molded form may require longer exposure or treatment times within the noted periods of time than, for example, films or fibers to allow the fluorine-containing gas to provide the desired superficial contact with all portions of the surface.

The surface may be treated with the fluorine-containing gas at ambient temperatures (from about 20 degrees Centigrade (C) to about 30 degrees C.) or at slightly elevated temperatures; but in preferred practice, the exposure is preferably at temperatures less than about 40 degrees C. Higher temperatures may be employed, but an uncontrolled overtreating is more likely to occur under such conditions due to the increased reaction rate. Also, the use of unheated surfaces, or only slightly heated surfaces, is clearly more economical.

The continuous treatment of surfaces, in particular, web-like materials, is also contemplated. Because of the relatively short reaction time and the low concentration of fluorine, the present method is particularly suitable for continuous exposure and reaction.

The treating process is generally performed in an enclosed area, and means is provided for positioning the article that includes the surface within the area. Means must also be provided to charge the enclosed area with the fluorine-containing gas, to circulate the gas, as desired, and to recover and dispose of the gas. Following treatment of the surface, all of the fluorine-containing gas is purged from the area for safety reasons, and is recovered or rendered harmless before the treated article is removed. The fluorine-containing gas may, for example, be absorbed into an aqueous solution of sodium carbonate.

Magnetic media coating compositions for cure by electron beam radiation were prepared to determine the adhesion properties of terephthalate polyester (Mylar) films treated with a fluorine-containing gas according to the method of the present invention.

The production of magnetic recording structures, such as tapes and disks, is known. In these known processes, a liquid coating composition which has been pigmented with particles having the capacity to retain a magnetic orientation, referred to herein as magnetizable particles, is applied to an appropriate nonmagnetizable substrate. The pigmented coating may then be baked or irradiated to solidify the coating and fix the magnetizable particles in place within the coating, but the cure by baking is slow and may lack desired uniformity.

The radiation cure of the ethylenically unsaturated coating compositions is also well known. Ultraviolet radiation is particularly desirable for this purpose, but it does not penetrate opaque pigments very well. When the coating is to be extensively pigmented, as in coatings which are pigmented with magnetizable oxide particles to form magnetic recording structures, a more penetrating form of ionizing radiation is required, and electron beam radiation provides the preferred curing radiation.

To provide good film properties, the unsaturated materials present in the coating composition may include polyethylenically unsaturated materials, which are preferably oligomers.

The polyethylenically unsaturated materials used herein are conventional. It is preferred that the polyethylenically unsaturated materials be oligomeric to possess some significant molecular weight, but simple polyacrylates and polymethacrylates of polyhydric alcohols are acceptable. These are illustrated by ethylene glycol diacrylate, butylene glycol diacrylate, 1,6-hexane glycol diacrylate, the diacrylate of the adduct of two moles of ethylene or propylene oxide with one mole of neopentyl glycol, glycerin diacrylate, trimethylol propane diacrylate and triacrylate, pentaerythritol triacrylate and tetraacrylate, and $C_2$–$C_4$ alkylene oxide adducts of these polyhydric alcohols providing higher molecular weight polyhydric alcohols with molecular weights up to about 6,000 which are esterified with acrylic acid. The corresponding methacrylates formed by replacing acrylic acid with methacrylic acid are also useful.

The preferred polyethylenically unsaturated materials are low to moderate molecular weight oliogmers having a small number of groups which are reacted, as with hydroxyethyl acrylate, to introduce terminal ethylenic groups. Oligomers having a molecular weight of from about 500 to about 50,000 and providing about 2–10 ethylenic groups per molecule are preferred. Especially preferred are those containing polyether groups held together by 4–20 urethane groups per molecule.

It is best to use polyethylenically unsaturated materials which are polyurethane oligomers based on diisocyanates. These may contain reactive groups to enhance wetting, such as hydroxy groups. This may be achieved when such materials are linked together with an at least trifunctional polyol, such as glycerin or trimethylol propane, or an amino alcohol containing at least one hydroxyl group and sufficient hydroxy and/or amino hydrogen atoms to react with all of the isocyanate functionality present, such as monoethanolamine.

The above oligomers are preferably hydroxy-functional diethylenically unsaturated polyurethanes produced by reacting a linear acrylate-terminated polycarbonate diol polyurethane oligomer as described in U.S. Pat. No. 4,496,686, which is assigned to the present assignee and which is incorporated herein by reference.

Other useful oligomers are polyurethanes formed by reacting 5 moles of polypropylene glycol of molecular weight 600 with 6 moles of isophorone diisocyanate and 2 moles of 2-hydroxyethyl acrylate.

One can also use polyepoxide polyesters with acrylic or methacrylic acid. Suitable polyepoxides are illustrated by diglycidyl ethers of bisphenols, like bisphenol A, having a molecular weight of from about 350 to about 7,000. A diglycidyl ether of bisphenol A having a molecular weight of about 1,000 and reacted with two molar proportions of acrylic acid provides a preferred illustration.

Other oligomers having from 2-10 reactive groups per molecule may also be used, such as polyesters. Thus, hydroxy-functional polyesters made by polyesterifying a dicarboxylic acid, like phthalic or adipic acids, with a small excess of diol, like ethylene glycol or 1,4-butane diol, will provide a low molecular weight polymer which can be converted to a polyacrylate by reaction with an equimolar adduct of 2-hydroxyethyl acrylate with a diisocyanate, like isophorone diisocyanate. A proportion of trifunctional material, such as trimethylol propane, may be included in the polyester to increase its functionality.

The term "polyacrylate" is used herein to indicate a plurality of acrylic acid ester groups, and this is one accepted use of this term. Similarly, the term "polymethacrylate" indicates a plurality of methacrylic acid ester groups. Also, the molecular weights included herein are number average molecular weights.

As will be evident, a polyethylenically unsaturated material which will polymerize on radiation exposure is necessary to provide good film properties, but its selection is conventional and is not a feature of this invention. The lower its molecular weight, the greater its liquidity, and the smaller the proportions of other reactive and nonreactive liquids which are needed to lower the viscosity to where the liquid mixture can be applied as a coating. It is preferred that at least 30 percent, preferably at least 50 percent of the ethylenically unsaturated portion of the coating composition be polyethylenic.

It is also desirable to reduce the viscosity of the coating composition by having present at least 10 percent of the ethylenically unsaturated portion of the coating of monoethylenically unsaturated liquid. These are available in many different types and will be selected based on their reactivity, their glass transition temperature and their other characteristics. Suitable liquid monomers which can be used are methyl acrylate, 2-hydroxyethyl acrylate, phenoxyethyl acrylate, methyl methacrylate, 2-ethylhexyl acrylate, ethoxy ethoxyethyl acrylate, isobornyl acrylate, and the corresponding methacrylates.

It will be understood that the acrylates are more rapidly reactive and are preferred for that reason. On the other hand, the methacrylates form good films when appropriately exposed, and other monoethylenically unsaturated acid esters, like esters of crotonic acid, are also useful, although such materials are not as readily available from commercial sources.

The desired liquidity of the coating composition can also be obtained using inert volatile organic solvents, like acetone, butyl acetate or isopropanol. These solvents can be used alone or in admixture with one another, and are frequently present in pigmented systems containing a pigment to binder weight ratio in excess of 1:1 in an amount to reduce the total solids content of the pigmented coating to the range of from about 25 percent to about 60 percent.

The coating compositions used in this invention are pigmented, preferably in a pigment to binder weight ratio of at least about 0.5:1. As previously described, many of these pigments absorb ultraviolet light so that a more penetrating form of ionizing radiation is needed for cure, especially electron beam radiation. Magnetic oxide particles are particularly desired since these allow the provision of magnetic recording structures, especially when used in a pigment to binder weight ratio of at least 2:1. Regardless of the purpose of the pigmented coating, the pigment must be uniformly ground into and wetted by the vehicle if a cured coating containing uniformly dispersed pigment is to be formed. This is facilitated by the presence of the ethylenically unsaturated radiation-curable dispersants which are used herein.

A typical composition in this invention intended to be cured by electron beam exposure contains a pigment to binder weight ratio of 3:1. This composition would also include the inert volatile organic solvent to provide coating viscosity. This solvent reduces the total solids content of the pigmented coating to the range of about 25 percent to about 60 percent. The composition may also contain agents which enhance pigment wetting, such as those disclosed in U.S. Pat. No. 4,496,686 to R. E. Ansel, the disclosure of which is incorporated herein by reference. These dispersants have the advantage of being radiation-curable and are typically used in a proportion of about 2 percent, based on the weight of the pigment.

As will be understood, a prime purpose of pigmenting a coating composition is to provide an opaque coating with an attractive appearance, so titanium dioxide rutile is a preferred pigment. Additional colorants may be added to provide desired coloration, as is common knowledge in the making of paint.

Referring more particularly to the ethylenically unsaturated radiation-curable dispersants which are illustrated herein, these are normally added to the liquid vehicle prior to pigmentation, but the proportion of the dispersant present may be measured either prior to or subsequent to incorporation of the pigment. The usual pigmented systems described herein include an inert volatile organic solvent to provide the solids content previously noted. The pigment-free vehicle will contain from about 1 percent to about 20 percent of the dispersant, preferably from 3 percent to 16 percent. In the pigmented coating, the dispersant concentration is usually from about 0.25 percent to 7 percent, preferably from 1 percent to 5 percent.

This invention is illustrated in the Example which follows, it being understood that throughout this application all parts and proportions are by weight, unless otherwise specified.

The coating composition of the following Example includes about 80 percent, based on the total weight of nonvolatile resin solids in the composition, of a cobalt-treated gamma iron oxide (Titan X6000R which is commercially available from Titan Kogyo, Japan) and about 20 percent, also based on the total weight of nonvolatile resin solids, of a radiation-curable polymeric binder.

EXAMPLE

A stainless steel pint can is charged with 45.0 grams Titan X6000R pigment, 6.4 grams of a dispersant (Gafac RE-610, a phosphate ester type surfactant that is commercially available from General Aniline and Film Corp., Chemical Group, New York, N.Y.) and 48.6 grams cyclohexanone. The dispersant is used at a solids content of about 70 percent by weight nonvolatile materials in tetrahydrofuran (THF). The resulting mixture is shaken with a quantity of 0.125 inch stainless steel shot for about 3 hours to form a dispersion, and 21.0 grams of a urethane acrylate polymeric binder (prepared as described below) are added. The polymeric binder is used at a solids content of about 32 percent by weight nonvolatile materials in THF. The mixture containing the binder is then shaken for an additional 30 minutes.

The urethane acrylate polymeric binder of this Example is prepared as described in U.S. Application Ser. No. 703,546 which was filed Feb. 20, 1985 by Steven R. Schmid and which is assigned to the present assignee. The disclosure of that application is incorporated herein by reference.

In particular, a reaction vessel is charged with 8.64 moles of 4,4'-methylene-bis(cyclohexylisocyanate) [Desmodur W which is commercially available from Mobay Chemical Corp., Pittsburg, Pa. may be used], 2.16 moles of polytetramethylene glycol having a molecular weight of about 650 (Teracol 650 which is commercially available from the DuPont Co., Wilmington, Del. may be used), 2.16 moles of 1,1'-isopropylidene bis(p-phenyleneoxy-2-ethoxy) ethanol (Dianol 2210 from Akzo Chemie America, Burt, N.Y. may be used), 5000 grams of tetrahydrofuran and 4.6 gram of dibutyl tin dilaurate.

This mixture is stirred and the temperature is allowed to increase exothermically to 60 degrees C. After one hour at this temperature, 0.40 mole of 2-hydroxyethyl acrylate and 2.3 grams of phenothiazine are added, and the mixture is maintained at 35 degrees C. to 40 degrees C. with stirring for an additional ½ hour. Then 3360 grams of a tetrahydrofuran solution containing 4.12 moles of polyoxypropylene diamime having a molecular weight of 230 and two primary amine groups (Jeffamine D230, a product of Texaco Chemical Co., Houston, Tex. may be used) is added slowly to maintain a reaction temperature of 60 degrees C. This reaction is continued until free NCO is no longer detected, and then 5313 grams of tetrahydrofuran is added to yield a 30 percent solvent solution having a viscosity of about 6000 centipoises.

There is mixed with the solvent solution obtained above enough triacrylated polyhydroxypropyl melamine containing about 3.0 terminal hydroxypropyl groups per molecule (Melpol 125 may be triacrylated and used in a 65 percent solution in methyl ethyl ketone) to provide 10 percent of triacrylated melamine-based cross-linking agent based on the total weight of the polyacrylate oligomer and cross-linking agent. The mixture is stirred until it is homogeneous.

After the stainless steel shoot is removed, the coating composition of the Example is applied to polymeric surfaces using a Bird bar at dry film thicknesses of from about 0.3 mils to about 0.8 mils. The polymeric surfaces include Mylar disks which have been previously treated with a fluorine-containing gas, as described hereinafter, and untreated Mylar disks.

In particular, the following types of polymeric surfaces are used:
DuPont 300 gauge Mylar floppy disk (E. I. DuPont de Nemours & Co., Inc., Wilmington, Del.);
Teijin 75V Mylar floppy disk (Teijin Limited, Osaka, Japan); and
ICI Melinex 605 Mylar floppy disk (ICI Americas, Inc., Wilmington, Del.).

A minimum flash time of about 4 hours is allowed between the time the film is deposited and the time the radiation cure is started. The films may be cured at a dosage of 10 megarads with an ESI Electrocurtain Model CB/150/15/10L electron beam processor (manufactured by Energy Sciences, Inc., Woburn, Mass.). The resulting electron beam-cured films are uniformly pigmented.

Before the application of coating compositions of the type described in the Example, a series of the Mylar disks are treated with a number of fluorine-containing gases. Specifically, Mylar disks are exposed to nitrogen gases containing zero percent, 0.25 percent, 1.0 percent and 5.0 percent fluorine by volume for about 15 seconds at 25 degrees C. Adhesion is determined on uncrosshatched disks using both 810 (low tack) and 610 (high tack) adhesive tape (available as Scotch brand tape from the Commercial Tape Division, 3M Company, St. Paul, Minn.).

Application of the coating composition to untreated Mylar disks results in considerable adhesive failure between the composition and the disks. Mylar disks treated with a nitrogen gas containing only 0.25 percent by volume fluorine demonstrate a dramatic improvement in adhesion with only a minor loss in adhesion upon repeated taping. There are no significant differences in adhesion properties between the Mylar samples treated with 0.25 percent, 1.0 percent and 5.0 percent fluorine for the brief period noted, and the coating composition of the Example.

Medium density, low density and very low density polyethylene sheets (MDPE, LDPE and LLDPE, respectively) when treated according to the present method exhibit improved adhesion (at least about 50 percent increased adhesion) with radiation-curable coating compositions of the type described herein. Such polyethylene materials may be obtained from Dow Chemical Co., Midland, Mich.

As a result of these studies, it was found that the use of a fluorine concentration less than 1.0 percent under the conditions described herein provides a dramatic improvement in the adhesion of radiation-curable coating compositions to fluorine-treated surfaces. The use of a fluorine concentration greater than 1.0 percent (as is generally employed in the prior art) provides no significant additional advantage in adhesion properties.

When other radiation-curable coating compositions are used, a limited advantage in adhesion properties may be obtained as the fluorine concentration is increased. But the limited advantage in the adhesion properties is obtained at considerable economic sacrifice resulting from the higher fluorine concentrations employed.

The improved adhesion of a radiation-curable coating composition to the surface of a magnetic recording structure, such as a tape or disk, when treated in a relatively superficial manner according to the method of the present invention is not only unexpected, but provides substantial economic benefits. Moreover, the short reaction time and low concentration of fluorine make the present method particularly suitable for use in commercial processes including the continuous treatment of surfaces.

What is claimed is:

1. A method for coating a terephthalate polyester surface to increase the adhesion between the surface and a subsequently applied radiation-curable coating comprising the steps of contacting the surface with a gas containing elemental fluorine including at least about 99 percent of an inert gas, based on the volume of the fluorine-containing gas, at a temperature less than about 40 degrees Centigrade and for a period of time less than about 1 minute, applying to the so-treated surface a radiation-curable coating composition, and then exposing said radiation-curable coating to radiation to cure the same.

2. The method according to claim, 1 wherein the radiation used to cure the coating is electron beam radiation.

3. The method according to claim 1 wherein the fluorine-containing gas includes from about 0.20 percent to about 0.80 percent fluorine.

4. The method according to claim 1 wherein the fluorine-containing gas includes from about 0.40 to about 0.60 percent fluorine.

5. The method according to claim 1 wherein said inert gas is nitrogen or helium.

6. The method according to claim 1 wherein the temperature is from about 20 degrees Centigrade to about 30 degrees Centigrade.

7. The method according to claim 1 wherein the period of time is from about 5 seconds to about 50 seconds.

8. The method according to claim 1 wherein the period of time is from about 10 seconds to about 40 seconds.

9. The method according to claim 1 wherein said radiation-curable coating is a magnetic medium coating composition.

10. The method according to claim 1 wherein the radiation-curable coating is formed of a coating composition comprising a liquid vehicle of coating viscosity having an ethylenically unsaturated portion including one or more polyethylenically unsaturated materials adapted to cure on radiation exposure, and pigment dispersed in said vehicle.

11. The method according to claim 10 wherein said pigment comprises magnetic oxide particles.

12. A coated polymeric surface treated with a fluorine-containing gas according to the method of claim 1.

* * * * *